US009232452B2

(12) United States Patent
Wu

(10) Patent No.: US 9,232,452 B2
(45) Date of Patent: Jan. 5, 2016

(54) METHOD OF HANDLING AN INTER RAT HANDOVER IN WIRELESS COMMUNICATION SYSTEM AND RELATED COMMUNICATION DEVICE

(75) Inventor: Chih-Hsiang Wu, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 932 days.

(21) Appl. No.: 12/536,461

(22) Filed: Aug. 5, 2009

(65) Prior Publication Data

US 2010/0113024 A1 May 6, 2010

Related U.S. Application Data

(60) Provisional application No. 61/109,927, filed on Oct. 31, 2008.

(51) Int. Cl.
*H04W 4/00* (2009.01)
*H04W 36/14* (2009.01)
*H04W 48/08* (2009.01)

(52) U.S. Cl.
CPC ............ *H04W 36/14* (2013.01); *H04W 48/08* (2013.01)

(58) Field of Classification Search
CPC .......... H04W 36/00; H04W 36/0005–36/0094
USPC .................................................. 370/310–350
See application file for complete search history.

(56) References Cited

U.S. PATENT DOCUMENTS

| 6,978,138 | B2 | 12/2005 | Japenga |
| 7,697,935 | B2 | 4/2010 | Guyot |
| 2007/0030830 | A1 | 2/2007 | Sagne |
| 2007/0049277 | A1* | 3/2007 | Nakamata et al. ............ 455/436 |
| 2007/0060127 | A1 | 3/2007 | Forsberg |
| 2008/0043669 | A1 | 2/2008 | Gallagher |
| 2008/0186919 | A1 | 8/2008 | Huang |
| 2008/0267128 | A1 | 10/2008 | Bennett |
| 2009/0025060 | A1* | 1/2009 | Mukherjee et al. ... H04W 12/02 726/3 |
| 2012/0165018 | A1* | 6/2012 | Zhao et al. .................... 455/436 |

FOREIGN PATENT DOCUMENTS

| CN | 1717952 | A | 1/2006 |
| CN | 1835632 | A | 9/2006 |
| CN | 1879349 | A | 12/2006 |
| CN | 1953600 | A | 4/2007 |
| CN | 101005489 | A | 7/2007 |

(Continued)

OTHER PUBLICATIONS

3GPP TS 25.331 V7.5.0, Release 7, Jun. 2007, pp. 2-1429.*

(Continued)

*Primary Examiner* — Andrew Chriss
*Assistant Examiner* — Kenan Cehic
(74) *Attorney, Agent, or Firm* — Winston Hsu; Scott Margo

(57) ABSTRACT

A method of handling an inter-RAT handover for a mobile device in a wireless communication system includes when, via a handover from a serving network using a first RAT to a target network using a second RAT, the mobile device succeeds in establishing a connection to the target network and has packet switched data for transmission, transmitting a predetermined radio resource control message, indicating existence of a packet switched signaling connection of the mobile device, to the target network.

14 Claims, 15 Drawing Sheets

(56) References Cited

FOREIGN PATENT DOCUMENTS

| | | |
|---|---|---|
| CN | 101009932 A | 8/2007 |
| CN | 101018394 A | 8/2007 |
| CN | 101061738 A | 10/2007 |
| CN | 101291537 A | 10/2008 |
| EP | 1 494 494 A2 | 1/2005 |
| EP | 1 494 494 A3 | 11/2005 |
| EP | 1 775 984 A2 | 4/2007 |
| TW | 200824398 | 6/2008 |

OTHER PUBLICATIONS

3GPP TS 25.331 V8.4.0 Radio Resource Control (RRC), Sep. 2008.
3GPP TS 36.331 V8.3.0 Evolved Universal Terrestrial Radio Access (E-UTRA) Radio Resource Control (RRC), Sep. 2008.
3GPP TS 23.272 V8.1.0 Circuit Switched Fallback in Evolved Packet System; Stage 2, Sep. 2008.
3GPP TS 25.331 Specification Detail list (with availability dates), pp. 1-5, especially p. 4 under Rel 8, RP-41, 8.4.0, Sep. 23, 2008.
3GPP TS 33.102 Version 8.0.0, Release 8, Jun. 2008, p. 33-34.
Office action mailed on Dec. 21, 2012 for the Taiwan application No. 098136976, filing date Oct. 30, 2009, p. 1-8.
European patent application No. 12005677.5, European application filing date: Sep. 30, 2009, European Search Report mailing date: Feb. 7, 2013.
Office action mailed on Mar. 25, 2013 for the European application No. 12005677.5, filing date Sep. 30, 2009, cover page + p. 1-6.
HTC Corporation, "Clarification on signalling connection establishment after HO from E-UTRAN", 3GPP TSG-RAN2 Meeting #65bis, R2-092366, Mar. 23-27, 2009, Seoul, Korea, XP050340102.
3GPP TS 25.331 Specification Detail list (with availability dates), pp. 1-5, especially p. 4 under Rel 8, RP-41, 8.4.0.
Office action mailed on Nov. 30, 2012 for the U.S. Appl. No. 13/449,331, filed Apr. 18, 2012, pp. 1-12.
Office action mailed on Jul. 24, 2013 for the European application No. 09012420.7, filing date Sep. 30, 2009, cover page + p. 1-4.
Alcatel-Lucent, "Consultation Mechanism for Inter-RAT UE Capabilities", 3GPP TSG RAN WG2 #61, R2-081190, Feb. 11-15, 2008, Sorrento, Italy, XP050138963, pp. 1-4.
ETSI TS 125 331 V8.4.0 (Oct. 2008), "Universal Mobile Telecommunications System (UMTS); Radio Resource Control (RRC); Protocol specification", Sep. 23, 2008, pp. 41, 117, 118, 233-236, 244, 246, 247, 413, 486, 487, 449, 450, 612, 643, 822, 823.
Office action mailed on Sep. 27, 2013 for the U.S. Appl. No. 13/449,331, filed Apr. 18, 2012, p. 1-24.
Office action mailed on Nov. 3, 2014 for the China application No. 201210106895.8, filing date Oct. 30, 2009, p. 1-5.
Office action mailed on Feb. 27, 2014 for the China application No. 201210107031.8, filing date: Oct. 30, 2009.
Office action mailed on Mar. 5, 2014 for the China application No. 201210106885.4, filing date: Oct. 30, 2009.
Office action mailed on Mar. 5, 2014 for the China application No. 201210106895.8, filing date: Oct. 30, 2009.
Office action mailed on Apr. 3, 2014 for the China application No. 201210107029.0, filing date: Oct. 30, 2009.

* cited by examiner

METHOD OF HANDLING AN INTER RAT HANDOVER IN WIRELESS COMMUNICATION SYSTEM AND RELATED COMMUNICATION DEVICE

CROSS REFERENCE TO RELATED APPLICATIONS

This application claims the benefit of U.S. Provisional Application No. 61/109,927, filed on Oct. 31, 2008 and entitled "METHOD OF HANDLING MOBILITY BETWEEN DIFFERENT RATS IN WIRELESS COMMUNICATIONS SYSTEM AND RELATED COMMUNICATION DEVICE" the contents of which are incorporated herein.

BACKGROUND OF THE INVENTION

1. Field of the Invention

The present invention relates to a method utilized in a wireless communication and communication device thereof, and more particularly, to a method of handling an inter-RAT (Radio Access Technology) handover in a wireless communication system and communication device thereof.

2. Description of the Prior Art

A handover procedure can transfer a mobile device from a communication state to another communication state. The communication state change can correspond to a telecommunication system, a cell, or a frequency layer scale, and corresponding handover is known as an inter-radio access technology (RAT), an inter/intra-cell or an inter-frequency handover.

For the inter-RAT handover, an X RAT can use an X handover procedure to hand over a mobile device to a Y RAT by sending an X handover message including Y RAT configuration information. The mobile device configures itself to fit system requirements of the Y RAT according to the received Y RAT configuration information. Mostly, the Y RAT configuration information is formed as a message conforming to the specification of the Y RAT and includes mobility management, signaling connection, security, and capability information. Common RATs include UMTS (Universal Mobile Telecommunications System), GSM (Global System for Mobile communications), GERAN (GSM/EDEG radio access network) Iu mode system, CDMA (Code Division Multiple Access) 2000, and LTE (Long Term Evolution) systems.

In the LTE system, a "mobility from E-UTRA" procedure is used to hand over a user equipment (UE) from the LTE system to another RAT, such as the UMTS, or GSM, GERAN Iu mode. For a handover to UMTS system, the radio access network of the LTE system, E-UTRAN (Evolved UMTS radio access network), initiates the mobility from E-UTRA procedure for a UE in a RRC_CONNECTED mode by sending a MobilityFromEUTRACommand message including a "HANDOVER TO UTRAN COMMAND" message that is a handover message of the UMTS system.

Due to the pure packet switched (PS) feature of the LTE system, a CS (circuit switched) fallback handover is introduced to an EPS (Evolved Packet System), enabling the provisioning of voice and other CS-domain services by reuse of CS infrastructure of the UMTS or GSM system when the UE is served by E-UTRAN. A CS fallback enabled terminal, connected to E-UTRAN, may use the GERAN or UTRAN (UMTS radio access network) to establish one or more CS-domain services. The CS fallback handover is only available in case E-UTRAN coverage is overlapped by either GERAN coverage or UTRAN coverage.

A successful handover requires proper cooperation of the UE, the source RAT, and the target RAT in the mobility, signaling connection, security, and capability aspects. In the signaling connection, a complete PS connection of the UMTS system is made up of two parts: an RRC (radio resource control) connection and an Iu connection part. The RRC connection is a connection between RRC layers of the UE and UTRAN, whereas the Iu connection is a connection between the UTRAN and the core network (CN) terminal, such as a SGSN (Serving GPRS Support Node) for the PS domain (i.e. Iu-PS connection) or a MSC (Mobile Switching Center) for the CS domain (i.e. Iu-CS connection).

In the abovementioned handovers from the LTE to the UMTS system, the Iu connection is certainly established, whereas the CS or PS signaling connection is established or not depended on a "RAB info" information element (IE) included in the HANDOVER TO UTRAN COMMAND message. The "RAB info" IE is used to identify a radio access bearer and has a "CN domain identity" IE that is used to indicate that a signaling connection is established for either PS or CS domain. In addition, when a HANDOVER TO UTRAN COMMAND message includes no "RAB info" IE, the UE determines that CS signaling connection is established.

On the standpoint of the UE, the whole PS connection is determined to be established when the UE receives a HANDOVER TO UTRAN COMMAND message that includes the "RAB info" IE and the "CN domain identity" IE indicates the PS domain, and to be unestablished when the received HANDOVER TO UTRAN COMMAND message does not include any "RAB info" IE or a received "CN domain identity" IE indicates the CS domain. An error in determining establishment of the PS connection is caused by the above UE actions.

Take an example. When a UE in an RRC idle mode of the LTE system makes a CS MO (Mobile Originating) call, a CS fallback handover is triggered, and the UE is thereby handed over from the E-UTRAN to UTRAN. During the handover, no "RAB Info" is included in the HANDOVER TO UTRAN COMMAND message because the UE in the RRC idle mode has no EPS RB (Radio Bearer) established for data transmission before the handover. Therefore, the UE determines that CS signaling connection is established. As a result, the UE sends an "RRC Initial Direct Transfer" message including a "CM Service Request" message to the UTRAN to establish the CS call. If PS data transmission (e.g. web browsing) is also triggered, the UE sends the "RRC Initial Direct Transfer" message including a service request to the UTRAN to establish a PS call, where the "RRC Initial Direct Transfer" message here triggers initiation/re-initiation of the whole PS connection. However, the Iu connection part of the PS connection has been established in UTRAN during handover procedure. In this situation, the UTRAN has to release the existing Iu connection when receiving the service request of the "RRC Initial Direct Transfer" message and then establishes a new Iu connection. This wastes system resource because the messages are required to be exchanged in UTRAN and CN for the unnecessary re-establishment of the Iu connection.

In the security configuration, the "CN domain identity" IE involves configuration of a START value, integrity, and ciphering. As well known, the UMTS system includes a $START_{PS}$ value for the PS domain and a $START_{CS}$ value for the CS domain, whereas only one START value is used in the LTE system. During the handover from the LTE to UMTS system, the UE needs to activate ciphering for all RBs (Radio Bearers) and SRBs (Signaling Radio Bearers) with the START value. The UE determines to use the $START_{PS}$ or the $START_{CS}$ value according to the domain indicated by the "CN domain identity" IE or use the $START_{CS}$ value when no "CN domain identity" IE is received. However, the UTRAN may not receive corresponding START value from the UE or the E-UTRAN during the handover. Different START values, irrespective of the domain type or the value, used between the UE and the UTRAN cause ciphering errors.

Take an example. When a UE in the RRC idle mode of the LTE system makes a CS MO call, a CS fallback is triggered, and the UE is handed over from E-UTRAN to UTRAN. In this case, no "CN domain identity" is included in the HANDOVER TO UTRAN COMMAND message, and also no configuration information of the START value is sent to the UTRAN. Therefore, the UE activates ciphering for all SRBs with the $START_{CS}$ value. However, the UTRAN may activate ciphering for all SRBs with the $START_{PS}$ value, causing ciphering errors.

For activation of integrity protection (IP), a security mode control procedure is initiated after the handover to the UMTS system instead of direct transmission of the IP configuration. This IP activating method is adopted in consideration of the HANDOVER TO UTRAN COMMAND message whose size is so critical for the GSM system that the IP information cannot be included during the handover from the GSM to the UMTS system. The integrity protection is started immediately after a handover by means of the security mode control procedure, causing a delay of the IP activation. Furthermore, the size of the HANDOVER TO UTRAN COMMAND message is not critical in the E-UTRAN since transmission bandwidth of the LTE system is increased much more than the GSM system. From the security aspect, the integrity protection associated with the handover from the LTE to UMTS system should always be started as soon as possible.

In the mobility management, CS call establishment involves UE location and the core network may not accept the establishment when the UE location information does not fit the system requirement. For example, a CS fallback handover is triggered when the UE makes a CS MO call in the E-UTRAN, and thereby the UE sends the "CM Service Request" message to establish the CS call. In case the MSC serving the 2G/3G target cell is different from the MSC that serves the UE while camping on the E-UTRAN, the MSC always rejects the CM service request if implicit location update is not performed for the UE. Moreover, the UE may not perform the location update after the MSC responds to the "CM Service Request" message, further delaying the CS call establishment.

In the capability requirement, a UE Capability Enquiry procedure is used for the E-UTRAN to obtain the capability of the UE. However, the related specifications do not specify whether to perform the UE Capability Enquiry procedure when the handover from the LTE system occurs and what capability information should be reported by the UE. In this situation, the target RAT may be unable to obtain capability information of the UE for the handover. Or, the UE may report insufficient capability information or capability information of a wrong target RAT through the UE Capability Enquiry procedure. Those cause signaling or connection errors after the handover.

In the prior art, the inter-RAT handover can fail or cause disconnection of a RRC connection when the capability, mobility, or security configuration/procedure for the handover is improperly performed as mentioned above.

SUMMARY OF THE INVENTION

The present invention provides a method and related communication device for handling an inter-RAT handover in a wireless communication system so as to solve the above-mentioned problems.

According to an aspect of the present invention, a method of handling an inter-RAT handover for a mobile device in a wireless communication system is disclosed. The method includes when, via a handover from a serving network using a first RAT to a target network using a second RAT, the mobile device succeeds in establishing a connection to the target network and has packet switched data for transmission, transmitting a predetermined radio resource control message, indicating existence of a packet switched signaling connection of the mobile device, to the target network.

According to another aspect of the present invention, a method of handling an inter-RAT handover for a mobile device in a wireless communication system is further disclosed. The method includes when the mobile device uses a first RAT and receives a message requesting device capability corresponding to a second RAT, sending a capability message, comprising preparation information, associated with a handover from the first RAT to the second RAT, to a serving network using the first RAT.

According to another aspect of the present invention, a method of handling an inter-RAT handover for a mobile device in a wireless communication system is further disclosed. The method includes when, via a handover from a serving network using a first RAT to a target network using a second RAT, a mobile device succeeds in establishing a connection to the target network, using a START value of a packet switched domain for ciphering at both the mobile device and the target network.

According to another aspect of the present invention, a method of handling an inter-RAT handover for a mobile device in a wireless communication system is further disclosed. The method includes receiving a handover initiating message comprising integrity protection information to perform a handover from a serving network using a first RAT to a target network using a second RAT, and according to the integrity protection information, starting integrity protection from transmission of the first uplink message after the handover initiating message.

According to another aspect of the present invention, a method of handling an inter-RAT handover for a mobile device in a wireless communication system is further disclosed. The method includes via a handover from a serving network using a first RAT to a target network using a second RAT, receiving a radio resource control message comprising location area information of the second RAT indicating a target location area, and performing a location area update procedure when the target location area is different from a location area where the mobile device is currently situated.

According to another aspect of the present invention, a communication device of a wireless communication system is further disclosed for accurately handling an inter-RAT handover. The communication device includes a computer readable recording medium, for storing program code corresponding to a process, and a processor that is coupled to the computer readable recording medium and used for processing the program code to execute the process. The process includes when, via a handover from a serving network using a first RAT to a target network using a second RAT, the communication device succeeds in establishing a connection to the target network and has packet switched data for transmission, transmitting a predetermined radio resource control message, indicating existence of a packet switched signaling connection of the communication device, to the target network.

According to another aspect of the present invention, a communication device of a wireless communication system is further disclosed for accurately handling an inter-RAT handover. The communication device includes a computer readable recording medium, for storing program code corresponding to a process, and a processor that is coupled to the computer readable recording medium and used for processing the program code to execute the process. The process includes when the communication device receives a message requesting device capability corresponding to a second RAT, sending a capability message, comprising preparation information associated with a handover from the first RAT to the second RAT, to the serving network using the first RAT.

According to another aspect of the present invention, a communication device of a wireless communication system is further disclosed for accurately handling an inter-RAT handover. The communication device includes a computer readable recording medium, for storing program code corresponding to a process, and a processor that is coupled to the computer readable recording medium and used for processing the program code to execute the process. The process includes when, via a handover from a serving network using a first RAT to a target network using a second RAT, a communication device succeeds in establishing a connection to the target network, using a START value of a packet switched domain for ciphering at both the communication device and the target network.

According to another aspect of the present invention, a communication device of a wireless communication system is further disclosed for accurately handling an inter-RAT handover. The communication device includes a computer readable recording medium, for storing program code corresponding to a process, and a processor that is coupled to the computer readable recording medium and used for processing the program code to execute the process. The process includes receiving a handover initiating message comprising integrity protection information to perform a handover from a serving network using a first RAT to a target network using a second RAT, and according to the integrity protection information, starting integrity protection from transmission of the first uplink message after the handover initiating message.

According to another aspect of the present invention, a communication device of a wireless communication system is further disclosed for accurately handling an inter-RAT handover. The communication device includes a computer readable recording medium, for storing program code corresponding to a process, and a processor that is coupled to the computer readable recording medium and used for processing the program code to execute the process. The process includes via a handover from a serving network using a first RAT to a target network using a second RAT, receiving a radio resource control message comprising location area information of the second RAT indicating a target location area, and performing a location area update procedure when the target location area is different from a location area where the communication device is currently situated.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
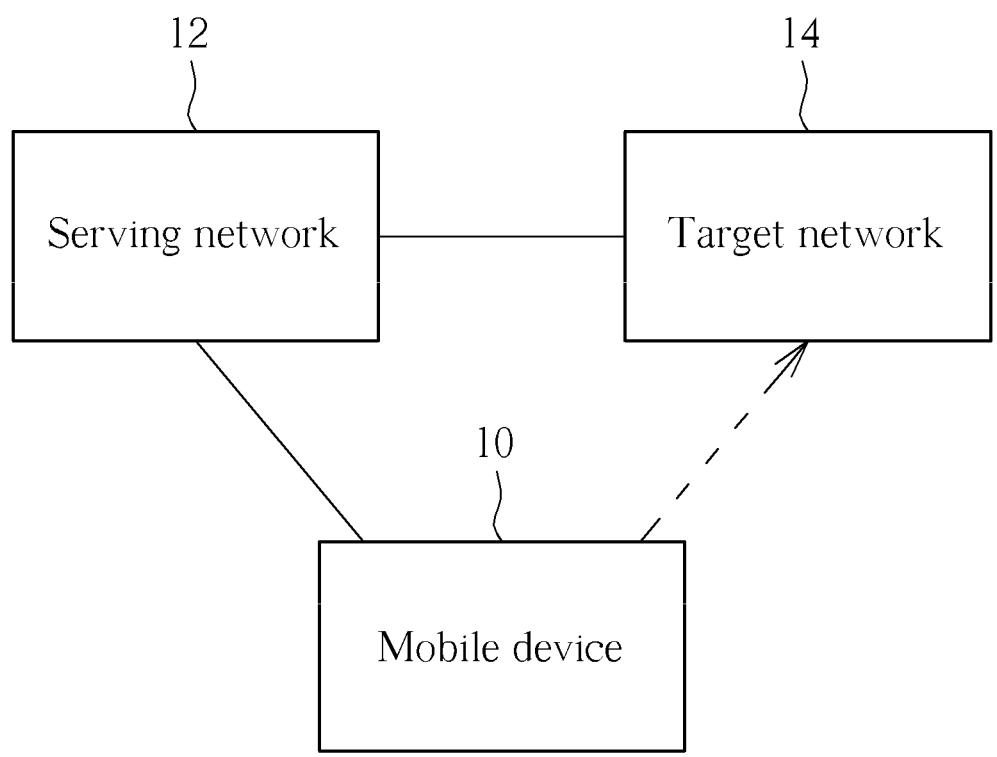
FIG. 1 illustrates a schematic diagram of system architecture corresponding to a handover.

Please refer to FIG. 1, which illustrates a schematic diagram of system architecture corresponding to a handover. In FIG. 1, a serving network 12 and a target network 14 employ different radio access technologies (RATs), and a mobile device 10 supports both of the RATs. Either of the RATs can be a UMTS (Universal Mobile Telecommunications System), GSM (Global System for Mobile communications), GERAN (GSM/EDEG radio access network) Iu mode system, or LTE (long-term evolution) system. In the LTE system, the network (either the serving network 12 or the target network 14) is referred as a E-UTRAN (evolved-UTRAN) comprising a plurality of eNBs (evolved-Node Bs); In the UMTS system, the network is referred as a UTRAN (UTRAN) comprising a radio network controller (RNC) and a plurality of NBs (Node Bs); In the GSM/GERAN Iu mode system, the network is referred as a GERAN comprising a base station controller (BSC) and a plurality of base stations. The mobile device are referred as a user equipment (UEs) or a mobile station (MS) supporting the abovementioned RATs and can be a device such as a mobile phone, a computer system, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver. When the mobile device 10 performs an inter-RAT handover from the serving network 12 to the target network 14, the serving network 12 transfers necessary configuration (capability, mobility, security configuration, etc.) of the target network 14 to the mobile device 10 so that the mobile device 10 changes configuration and establishes a connection to the target network 14. When the connection establishment is successful, the mobile device 10 disconnects with the serving network 12.

Figure 2:
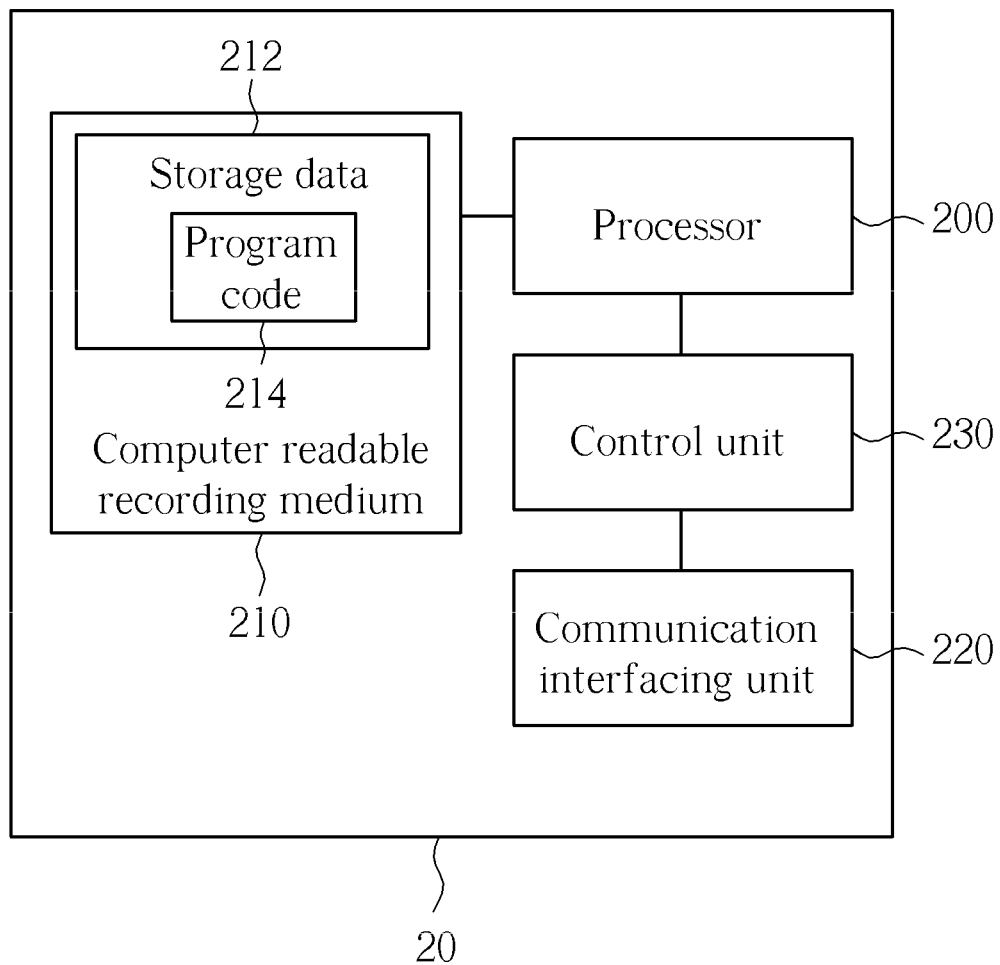
FIG. 2 illustrates a schematic diagram of a communication device according to an embodiment of the present invention.

Please refer to FIG. 2, which illustrates a schematic diagram of a communication device 20 according to an embodiment of the present invention. The communication device 20 can be the mobile device shown in FIG. 1 and includes a processor 200, a computer readable recording medium 210, a communication interfacing unit 220 and a control unit 230. The computer readable recording medium 210 is any data storage device that includes program code 214, thereafter read and processed by the processor 200. Examples of the computer readable recording medium 210 include a subscriber identity module (SIM), read-only memory (ROM), random-access memory (RAM), CD-ROMs, magnetic tapes, hard disks, optical data storage devices, and carrier waves (such as data transmission through the Internet). The control unit 230 controls the communication interfacing unit 220 and related operations and states of the communication device 20 according to processing results of the processor 200. The communication interfacing unit 220 is preferably a radio transceiver and accordingly exchanges wireless signals with the network.

Figure 3:
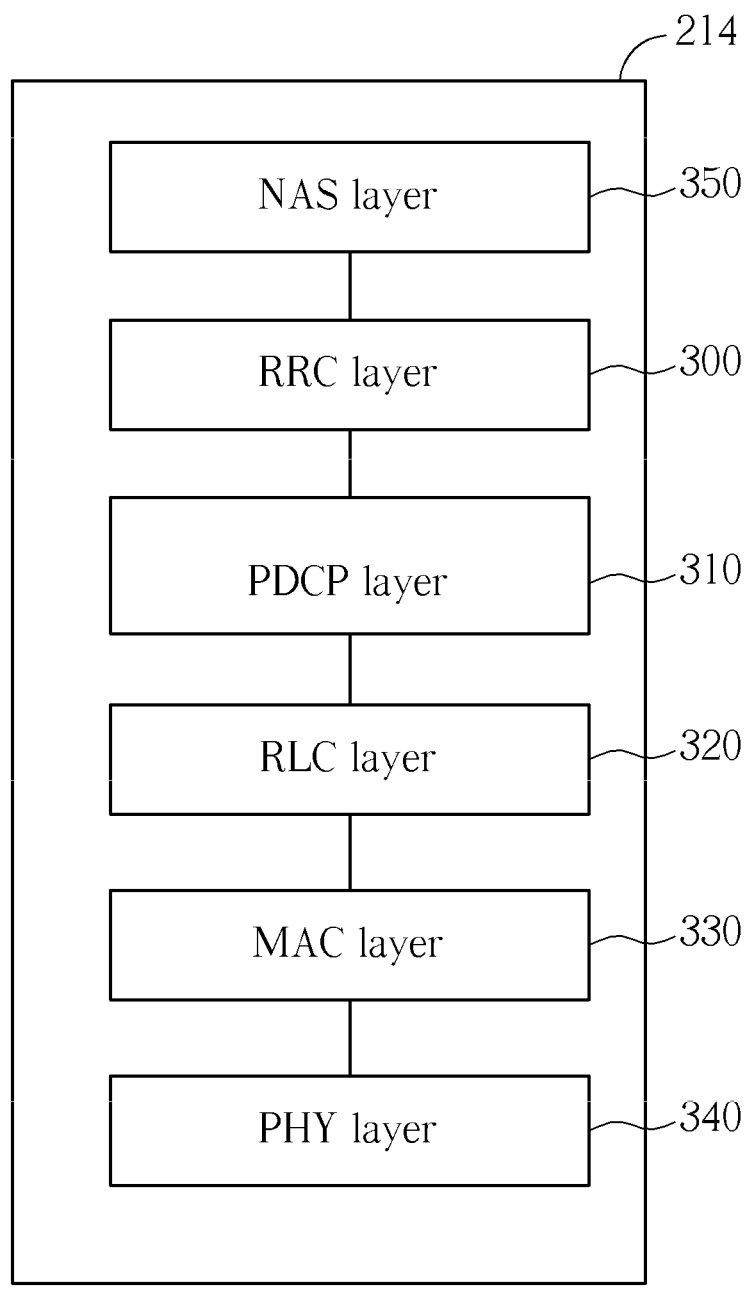
FIG. 3 illustrates a schematic diagram of the multiple communications protocol layers of the LTE system according to an embodiment of the present invention.

Please refer to FIG. 3, which illustrates a schematic diagram of the multiple communications protocol layers of the LTE system applied by the program code 214 according to an embodiment of the present invention. The program code 214 includes program code of multiple communications protocol layers, which from top to bottom are a non access stratum (NAS) layer 350, a radio resource control (RRC) layer 300, a packet data convergence protocol (PDCP) layer 310, a radio link control (RLC) layer 320, a medium access control (MAC) layer 330 and a physical (PHY) layer 340. The RRC layer 300 is responsible for processing RRC messages of different attributes, such as handover or capability attributes, so as to control the lower layers. The RRC messages may include NAS messages allowing communication with a core network (CN), such as a MME (mobile). In addition, the RRC layer 300 includes two sets of security configuration for a PS (packet switched) domain and a CS (circuit switched) domain, and each set is involved with integrity protection and ciphering.

When the communication device 20 performs an inter-RAT handover from the LTE to UMTS system, the E-UTRAN sends a MobilityFromEUTRACommand message including a "HANDOVER TO UTRAN COMMAND" message received from the UTRAN. The communication device 20 executes the handover according to configuration information of the "HANDOVER TO UTRAN COMMAND" message to fit system requirement of the UTRAN. If the handover is successfully completed, the UE moves to the UTRAN and sends a "HANDOVER TO UTRAN COMPLETE" message. The handover can be a normal handover or a CS (Circuit Switched) fallback handover. Following processes associated with the handover from the LTE to UMTS system are provided as embodiments without the purpose of limiting the scope of the present invention. In the following description, the handover from the LTE to UMTS system is equivalent to a handover from E-UTRAN (serving network) to UTRAN (target network); the handover from the LTE to GERAN system is equivalent to a handover from E-UTRAN (serving network) to GERAN (target network).

Figure 4:
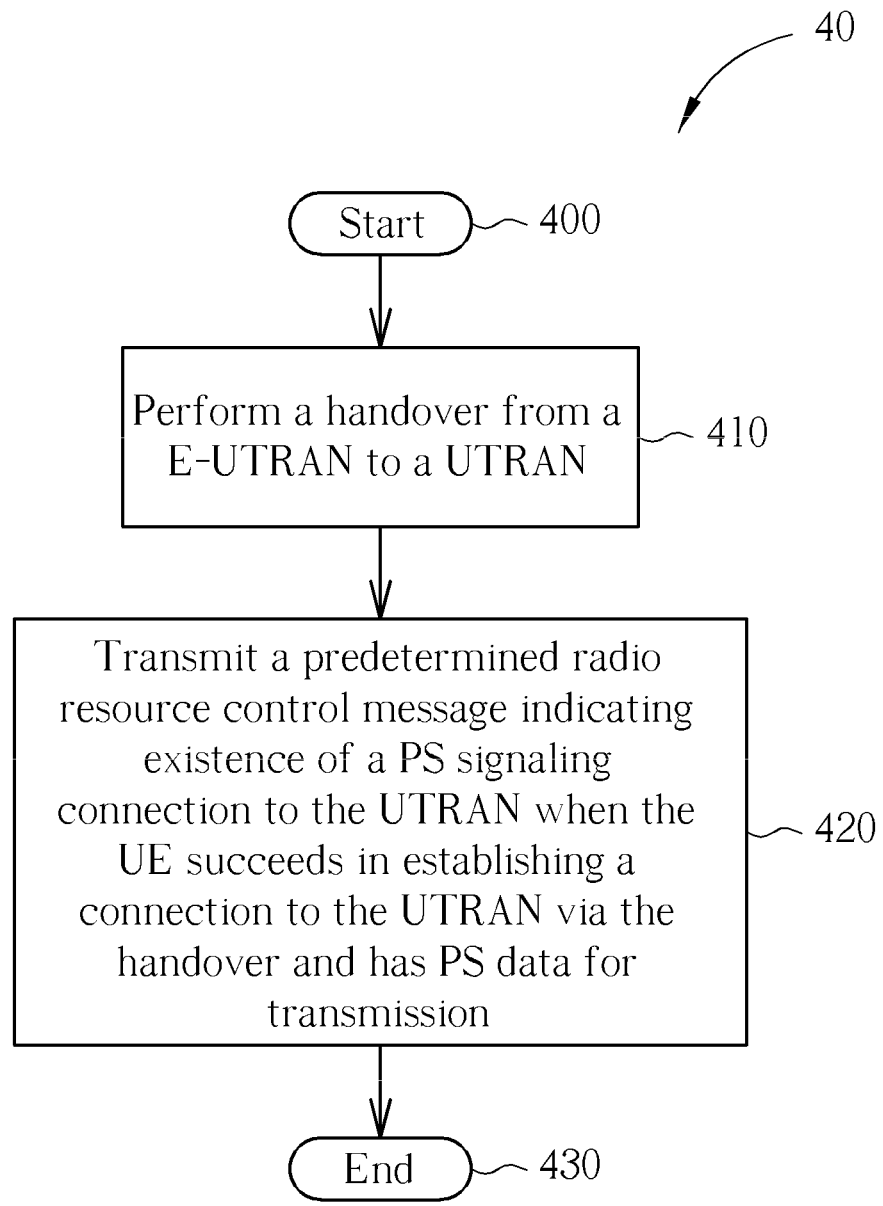
FIG. 4 illustrates a flowchart of a process according to an embodiment of the present invention.

Please refer to FIG. 4, which illustrates a flowchart of a process 40 according to an embodiment of the present invention. The process 40 is utilized for handling signaling connection associated with a handover from the LTE to UMTS system for a UE of a wireless communication system. The process 40 can be compiled into the program code 214 and includes the following steps:

Step 400: Start.

Step 410: Perform a handover from an E-UTRAN to a UTRAN.

Step 420: Transmit a predetermined radio resource control message indicating existence of a PS (Packet Switched) signaling connection to the UTRAN when the UE succeeds in establishing a connection to the UTRAN via the handover and has PS data for transmission.

Step 430: End.

According to the process 40, the UE performs the handover from the E-UTRAN (the network of the LTE system) to the UTRAN (the network of the UMTS system) and sends the predetermined RRC message to the UTRAN when a connection between the UE and the UTRAN is successfully established and the UE attempts to perform the PS data transmission, e.g. application data or NAS signaling messages. By means of the predetermined RRC message, the UE and the UTRAN treats that the PS signaling connection has been established after the handover. In this situation, re-establishment of the PS signaling connection at the UTRAN is avoided, thereby saving system resources.

Preferably, the predetermined RRC message is a UPLINK DIRECT TRANSFER message including NAS messages of the PS domain. Furthermore, the handover is initiated by a MobilityFromEUTRACommand message transmitted from the E-UTRAN to the UE. The MobilityFromEUTRACommand message includes a HANDOVER TO UTRAN COMMAND message that is provided by the UTRAN and does not include any "RAB info" IE (Information Element). In this situation, the RRC layer of the UE can indicate upper layers, such as a GPRS Mobility Management (GMM) or Session Management (SM) layer, that only CN system information of the PS domain is available. Thus, re-establishment of the Iu connection of the PS signaling connection can be avoided by means of using the UPLINK DIRECT TRANSFER message to transmit the NAS messages of the PS domain to the UTRAN.

Figure 5:
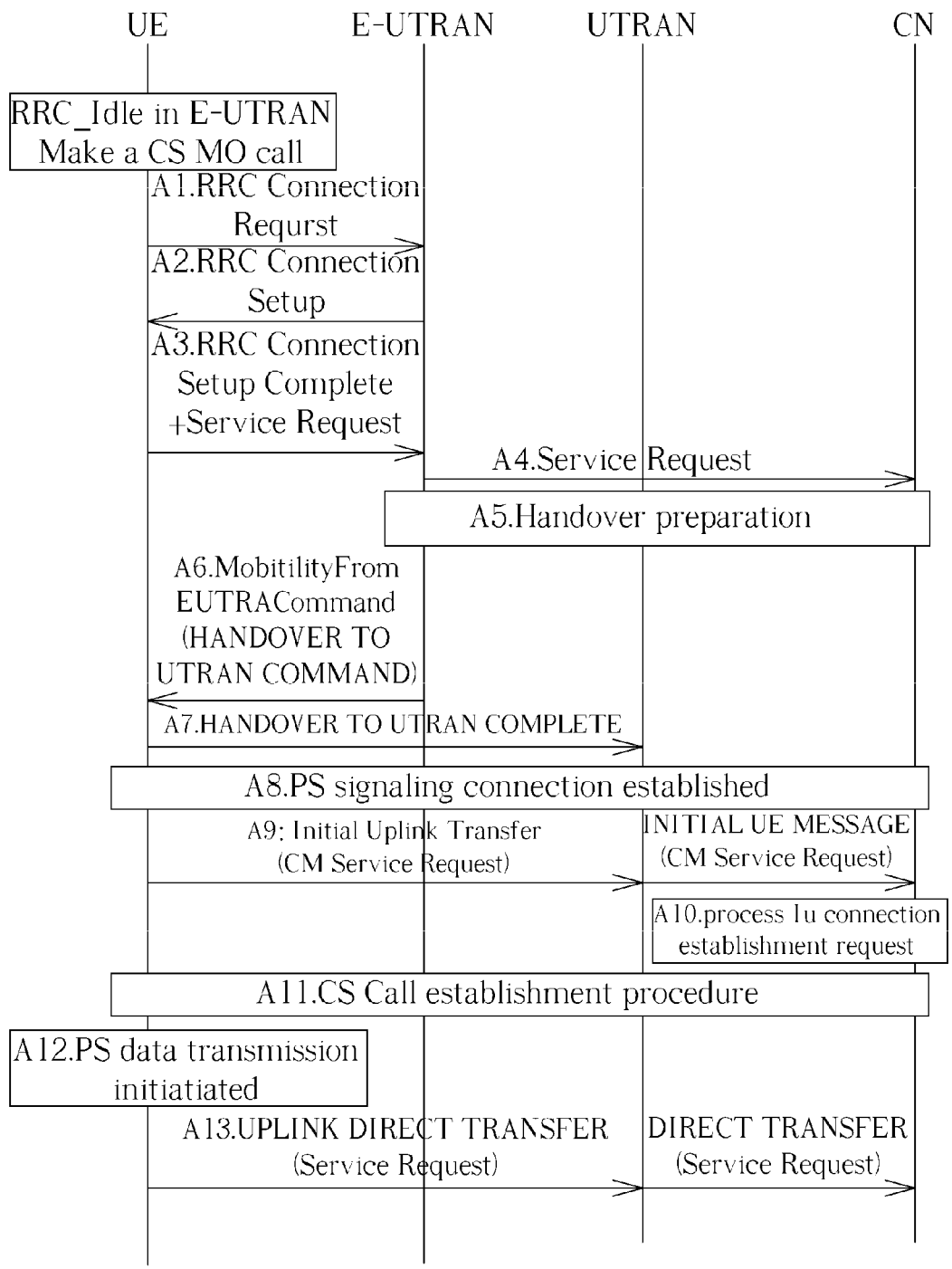
FIG. 5 illustrates a sequence diagram of an inter-RAT handover from the LTE to UMTS system.

Take an example for explanation of the concept of the process 40. Please refer to FIG. 5, which is a sequence diagram of an inter-RAT handover from the LTE to UMTS system. For simplicity, a CN (Core network) is considered including serving CN terminals, such as a MME (Mobility Management Entity) and a SGSN (Serving GPRS Support Node), or a target CN terminal, such as MSC (Mobile Switching Center). The UE has an initial RRC state of an RRC_Idle mode and makes a CS MO (Mobile Originating) call. As a result, the UE performs steps A1-A3 to establish an RRC connection with the E-UTRAN, and then the E-UTRAN sends a service request for the CS MO call to the CN (Core Network) in step A4. The E-UTRAN, UTRAN and CN together prepare a handover from the E-UTRAN to UTRAN in step 5 since the E-UTRAN does not support any CS services. In steps A6 and A7, the UE completes the handover from the E-UTRAN to UTRAN, and therefore a PS signaling connection between the UE, UTRAN and CN is established as step A8. Steps A9-A11 are performed to establish the CS MO call. After the CS MO call, the UE attempts to perform PS data transmission. In this situation, the UE treats that the PS signaling connection has been established according to the process 40, and thereby sends an UPLINK DIRECT TRANSFER message to the UTRAN for the PS data transmission in step A13. As a result, the UTRAN sends a DIRECT TRANSFER message for the PS data transmission instead of re-establishing the PS signaling connection that has been established in step A8.

Figure 6:
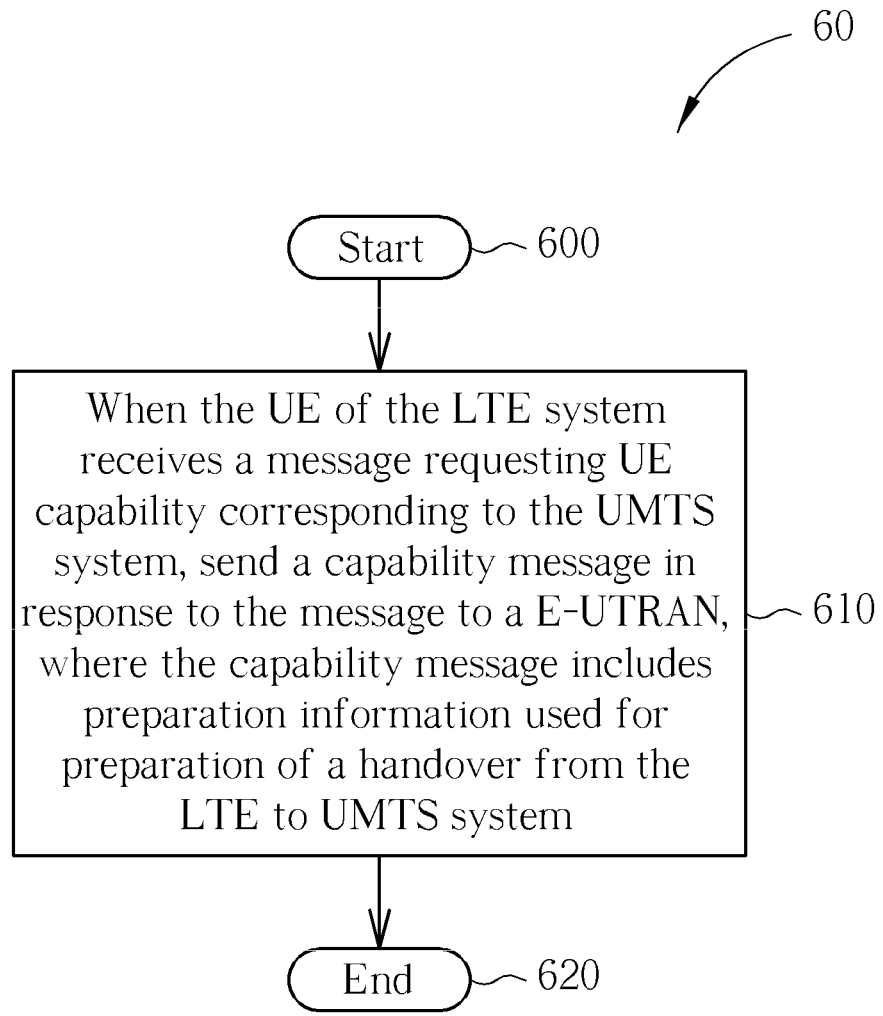
FIG. 6 illustrates a flowchart of a process according to an embodiment of the present invention.

Please refer to FIG. 6, which illustrates a flowchart of a process 60 according to an embodiment of the present invention. The process 60 is utilized for handling capability reporting associated with a handover from the LTE to UMTS system for a UE. The process 60 can be compiled into the program code 214 and includes the following steps:

Step 600: Start.

Step 610: When the UE of the LTE system receives a message requesting UE capability corresponding to the UMTS system, send a capability message in response to the message to a E-UTRAN, where the capability message includes preparation information used for preparation of a handover from the LTE to UMTS system.

Step 620: End.

According to the process 60, the UE sends the capability message including the preparation information to the E-UTRAN when receiving the message requesting UE capability corresponding to the UMTS system. Furthermore, security information, such as a $START_{PS}$ value or a $START_{CS}$ value for the situation where the UE has no DRB (Data Radio Bearer), can be included in the capability message or the preparation information. Therefore, the UE is able to report the UE capability corresponding to the UMTS system to the E-UTRAN, and thereby the E-UTRAN can transfer the reported UE capability to the UTRAN if necessary. For example, when a handover from the E-UTRAN to the UTRAN is triggered, the E-UTRAN can transfer the reported UE capability and the security information to the UTRAN before initiation of the handover.

Preferably, the message requesting the UE capability corresponding to the UMTS system is a UE CAPABILITY ENQUIRY message; the capability message is a UE CAPABILITY INFORMATION message; the preparation information is formed as an INTER RAT HANDOVER INFO message or IEs of the INTER RAT HANDOVER INFO message. In this situation, the UE having UTRAN capability sends a UE Capability Information message including the INTER RAT HANDOVER INFO message (one of UTRAN RRC messages) or the IEs thereof when receiving the UE CAPABILITY ENQUIRY message requesting the UE capability in the E-UTRAN.

Through the process 60, the UE is able to provide the target network with the corresponding capability information and security information for preparation of the inter-RAT handover, thereby avoiding signaling/connection errors caused by insufficient capabilities information.

Figure 7:
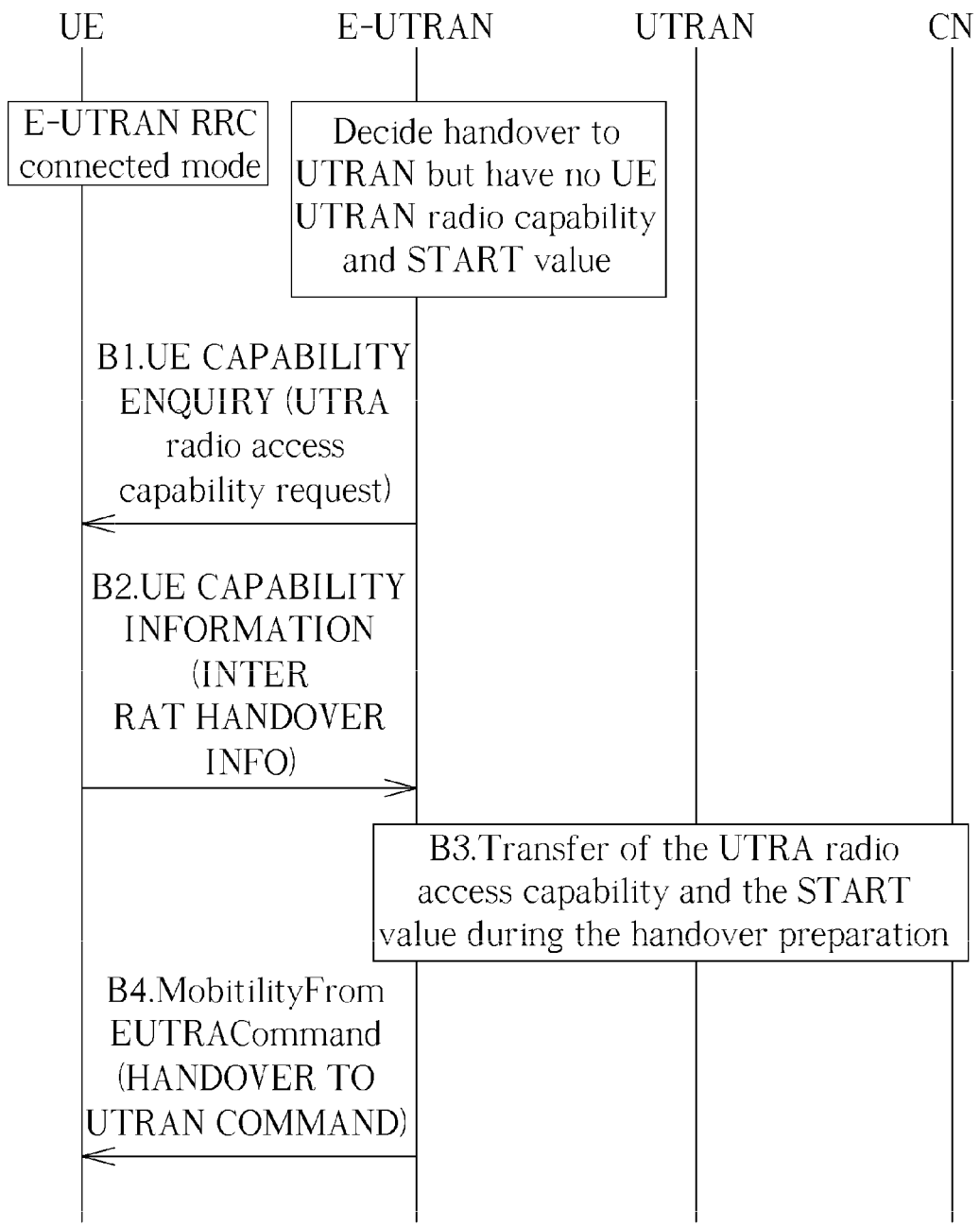
FIG. 7 illustrates a sequence diagram of a UE capability reporting procedure related to an inter-RAT handover.

Take an example for explanation of the concept of the process 60. Please refer to FIG. 7, which is a sequence diagram of a UE capability reporting procedure related to an inter-RAT handover. In FIG. 7, the UE has an initial RRC state of an RRC_Connected mode, whereas the E-UTRAN attempts to initiate a handover to UTRAN but has neither UTRAN capability of the UE nor a START value for the UTRAN to use after the handover. As a result, the E-UTRAN initiates a capability enquiry procedure by sending a UE CAPABILITY ENQUIRY message including a UTRA radio access capability request in step B1. In response to the UTRA radio access capability request, the UE performs step B2 to send a UE CAPABILITY INFORMATION message including an INTER RAT HANDOVER INFO message that is recognizable by the UTRAN and contains the UTRA radio access capability and a START value. In step B3, the E-UTRAN transfers the UTRA radio access capability and the START value to the UTRAN during the handover preparation. After this, the E-UTRAN initiates the handover from the E-UTRAN to UTRAN by sending a MobilityFromEUTRACommand message including a "HANDOVER TO UTRAN COMMAND" message in step B4. With the UTRA radio access capability, the UTRAN can properly configure the "HANDOVER TO UTRAN COMMAND" message. With the START value, the UTRAN and target CN terminals can accurately perform ciphering for the handover. Therefore, signaling or connection errors caused by insufficient capabilities/security information can be avoided.

Figure 8:
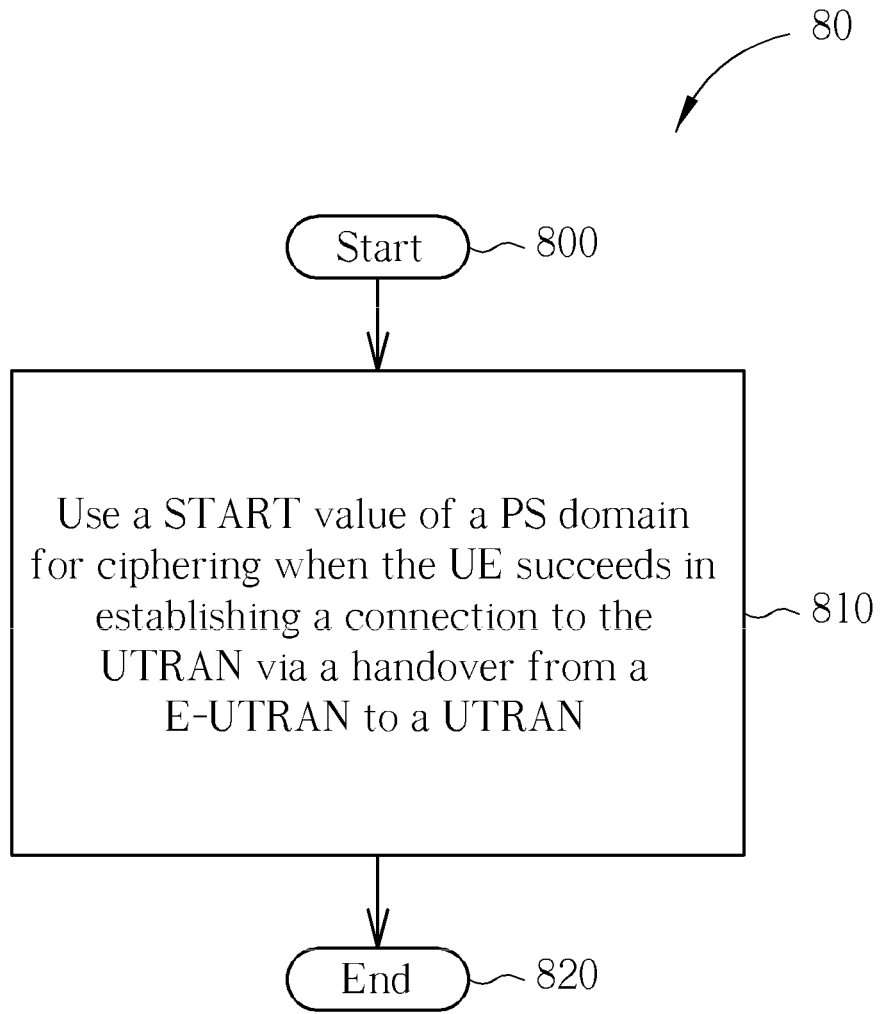
FIG. 8 illustrates a flowchart of a process according to an embodiment of the present invention.

Please refer to FIG. 8, which illustrates a flowchart of a process 80 according to an embodiment of the present invention. The process 80 is utilized for handling ciphering configuration associated with a handover from the LTE to UMTS system for both a UE and a UTRAN. The process 80 can be compiled into the program code 214 and includes the following steps:

Step 800: Start.

Step 810: Use a START value of a PS domain for ciphering when the UE succeeds in establishing a connection to the UTRAN via a handover from an E-UTRAN to a UTRAN.

Step 820: End.

According to the process 80, the UE and the UTRAN both use the START value of the PS domain (e.g. the $START_{PS}$ value) when the connection between the UE and the UTRAN is successfully established via the inter-RAT handover whose message transmission is described as above. Furthermore, the UE is predetermined to use the START value of the PS domain during the handover before any connection to the UTRAN is established.

The START value of the PS domain before the connection successfully established via the handover can be sent during the handover or a connection related to a UE capability procedure or a RRC connection establishment procedure. In this situation, the START value of the UE is sent in a UE CAPABILITY INFORMATION message or a RRC CONNECTION SETUP COMPLETE message. Alternatively, the START value can be transferred by the E-UTRAN to the UTRAN.

Figure 9:
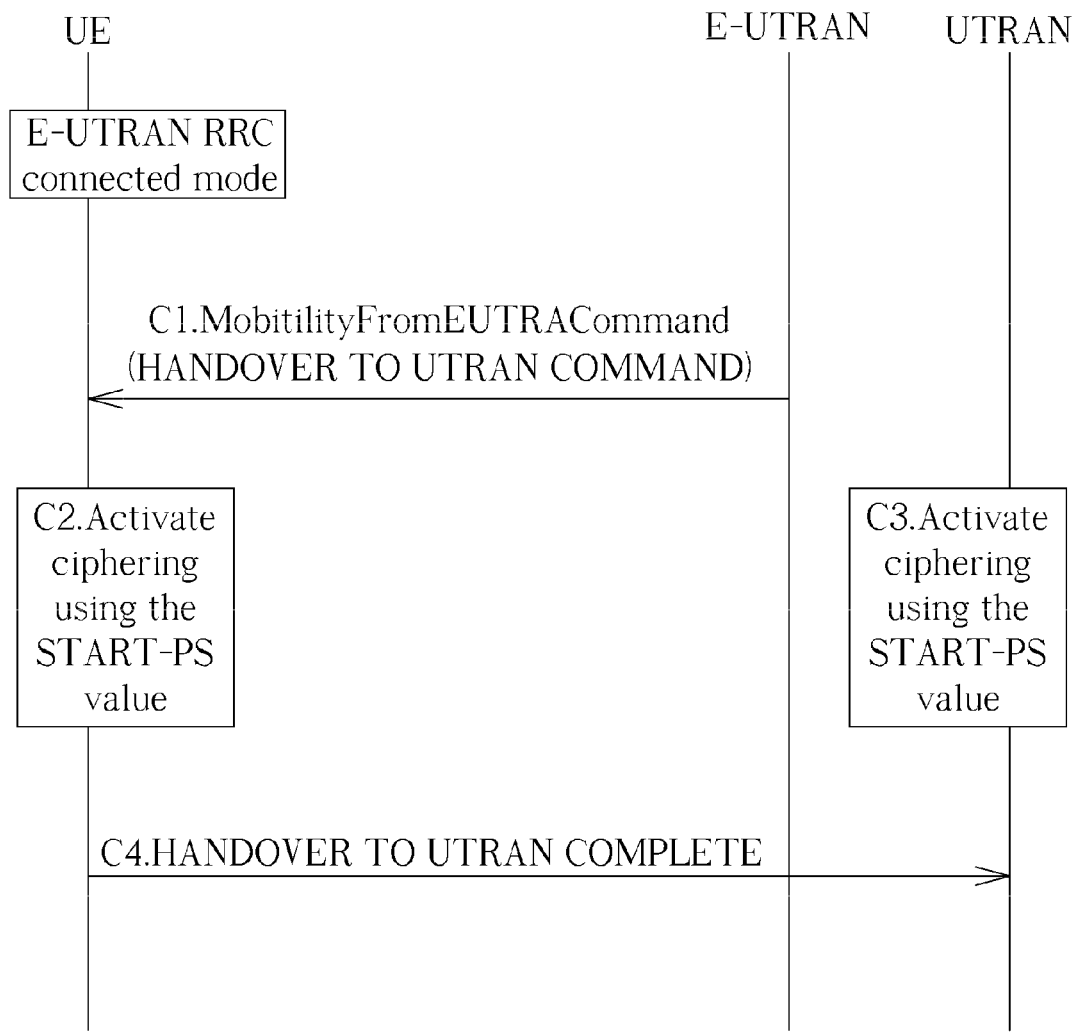
FIG. 9 illustrates a sequence diagram of a handover from the LTE to UMTS system.

Take an example for explanation of the concept of the process 80. Please refer to FIG. 9, which is a sequence diagram of a handover from the LTE to UMTS system. In FIG. 9, the UE has an initial RRC state of the RRC_Connected mode. In step C1, the E-UTRAN initiates the handover by sending a MobilityFromEUTRACommand message including a "HANDOVER TO UTRAN COMMAND" message that excludes the "RAB info" IE used for indicating a service domain of security. According to the predetermined setting, the UE activates ciphering with a $START_{PS}$ value in step C2 and then sends a HANDOVER TO UTRAN COMPLETE message in step C3. The UTRAN activates ciphering with a predetermined setting toward $START_{PS}$ and accordingly applies the $START_{PS}$ value for future transmissions related to the UE. Therefore, the ciphering between the UE and the UTRAN can be maintained successfully even though no "RAB info" IE is sent to the UE for indicating the service domain of security.

Figure 10:
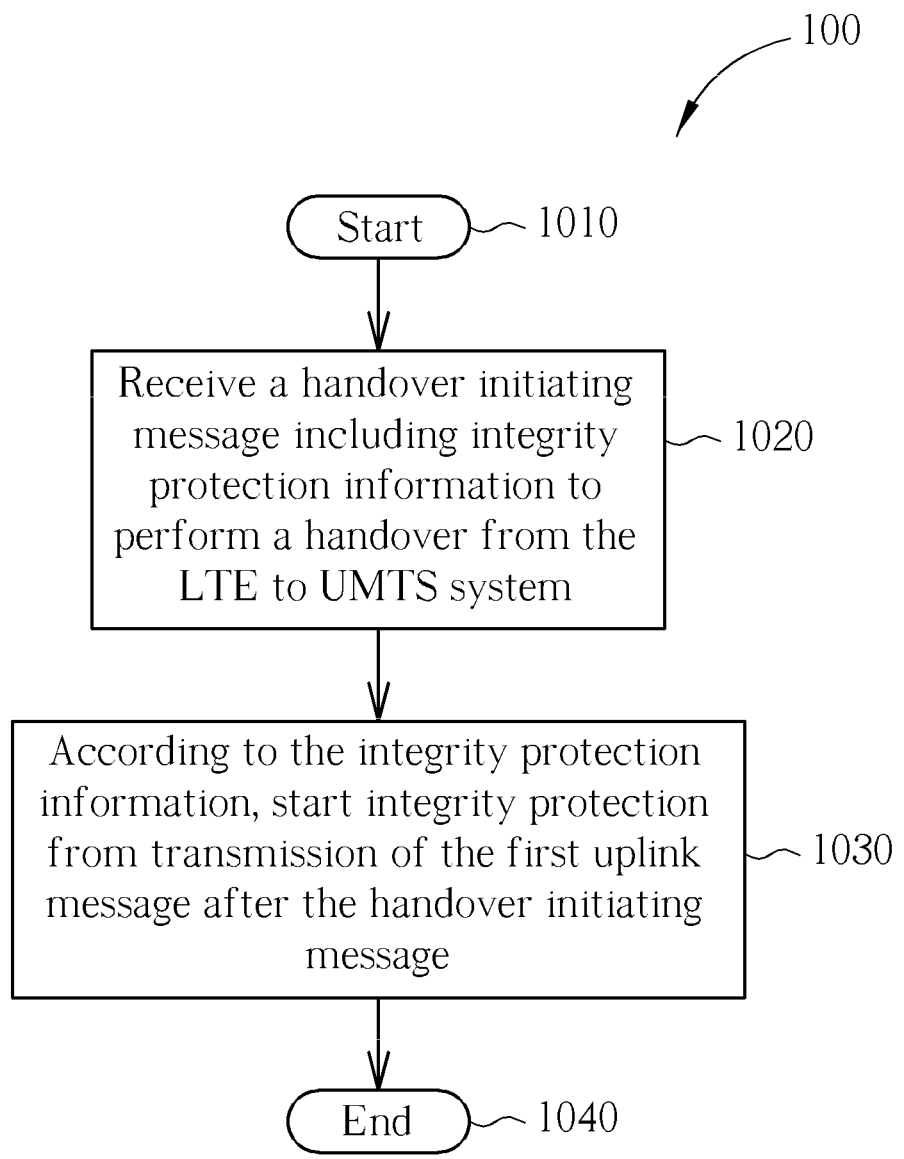
FIG. 10 illustrates a flowchart of a process according to an embodiment of the present invention.

Please refer to FIG. 10, which illustrates a flowchart of a process 1000 according to an embodiment of the present invention. The process 1000 is utilized for integrity protection configuration associated with a handover from the LTE to UMTS system for a UE. The process 1000 can be compiled into the program code 214 and includes the following steps:

Step 1010: Start.

Step 1020: Receive a handover initiating message including integrity protection information to perform a handover from the LTE to UMTS system.

Step 1030: According to the integrity protection information, start integrity protection from transmission of the first uplink message after the handover initiating message.

Step 1040: End.

According to the process 1000, the UE receives the handover initiating message including the integrity protection information from the E-UTRAN and then perform the handover from the LTE to UMTS system. The UE starts the integrity protection according to the integrity protection information and uses the integrity protection from the first uplink message transmission after the handover initiating message. In other words, transmissions of the first uplink message and the future messages are performed integrity protection or verified related integrity according to the integrity protection information. Furthermore, the integrity protection information is generated by either UTRAN (the target network) or E-UTRAN (the source network). If the integrity protection information is generated by E-UTRAN, the E-UTRAN transfers the integrity protection information to the UTRAN, and the UTRAN also activates integrity protection according to the integrity protection information.

Preferably, the handover initiating message including integrity protection information is a MobilityFromEUTRACommand message that is sent from the E-UTRAN to the UE and that includes a HANDOVER TO UTRAN COMMAND message. The integrity protection information includes a FRESH value and integrity protection algorithm information, and can be included in the MobilityFromEUTRACommand or HANDOVER TO UTRAN COMMAND message. Therefore the UE starts the integrity protection from a HANDOVER TO UTRAN COMPLETE message that is the first uplink message transmitted after the handover initiating message. Preferably, the HANDOVER TO UTRAN COMPLETE message includes a MAC (Message Authentication Code).

Through the process 1000, the UE is able to start the integrity protection at the completion of the handover rather than at the completion of a security mode control procedure triggered after the handover.

Figure 11:
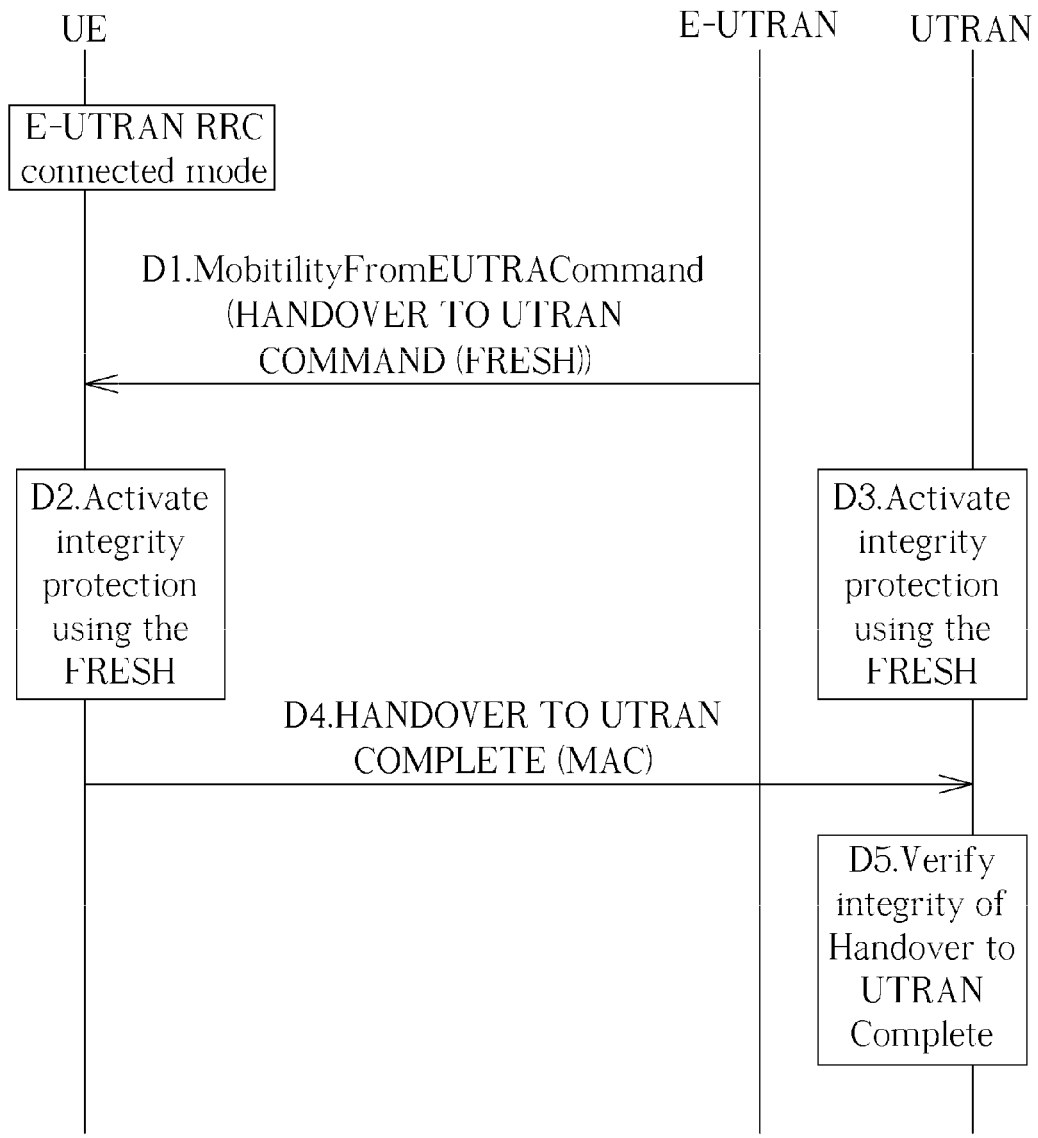
FIG. 11 illustrates a sequence diagram of a handover from the LTE to UMTS system.

Take an example for explanation of the concept of the process 1000. Please refer to FIG. 11, which is a sequence diagram of a handover from the LTE to UMTS system. In FIG. 11, the UE has an initial RRC state of the RRC_Connected mode. In step D1, the E-UTRAN sends a MobilityFromEUTRACommand message including a HANDOVER TO UTRAN COMMAND message including a FRESH value and a parameter of an integrity protection algorithm UIA1 that is specified by 3GPP (3rd Generation Partnership Project) specification, e.g. 3GPP TS 35.201 series. The UE activates integrity protection with the FRESH value and the integrity protection algorithm UIA1 in step D2. In FIG. 11, assume that the UTRAN has generated the FRESH value and the parameter of the integrity protection algorithm UIA1. As a result, the UTRAN also activates integrity protection with the same configuration in step D3. The UE applies the first-time integrity protection to the HANDOVER TO UTRAN COMPLETE message including the MAC, using the FRESH value and the integrity protection algorithm UIA1. In step D5, the UTRAN can successfully verify the integrity of the HANDOVER TO UTRAN COMPLETE message.

Figure 12:
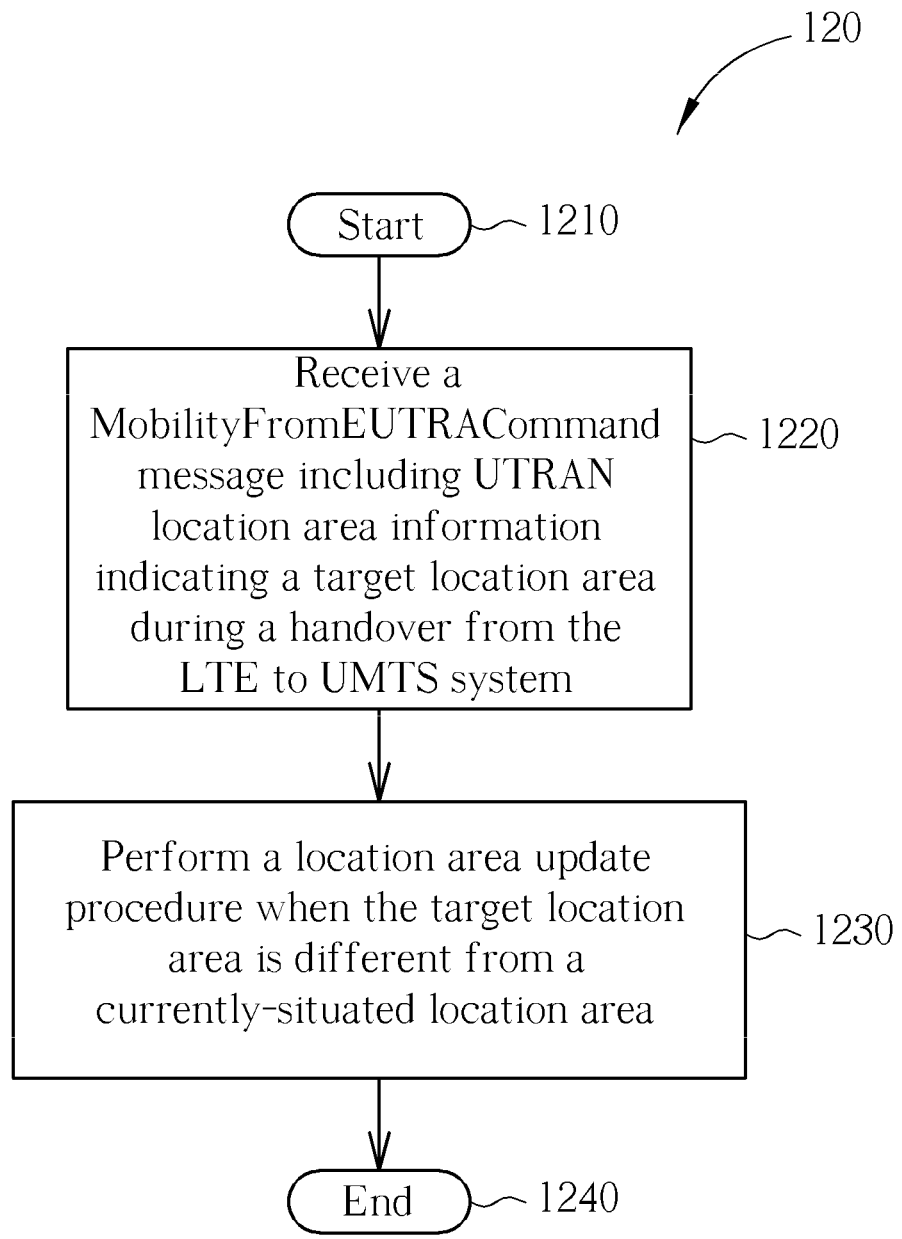
FIG. 12 illustrates a flowchart of a process according to an embodiment of the present invention.

For provision of clear location information during the handover from the LTE to UMTS system, UTRAN location area information of the UE is included in a MobilityFromEUTRACommand message or a HANDOVER TO UTRAN COMMAND message thereof to prevent a delay of service establishment caused by lack of the location information. In this situation, a process as below is provided for the UE to deal with the MobilityFromEUTRACommand message. Please refer to FIG. 12, which illustrates a flowchart of a process 1200 according to an embodiment of the present invention. The process 1200 is utilized for mobility configuration associated with a handover from the LTE to UMTS system for a UE. The process 1200 can be compiled into the program code 214 and includes the following steps:

Step 1210: Start.

Step 1220: Receive a MobilityFromEUTRACommand message including UTRAN location area information indicating a target location area during a handover from the LTE to UMTS system.

Step 1230: Perform a location area update procedure when the target location area is different from a currently-situated location area.

Step 1240: End.

According to the process 1200, the UE obtains the target location area, indicating a location area which the UE is going to enter after the handover, from the received UTRAN location area information of the MobilityFromEUTRACommand message. In addition, the currently-situated location area indicates a location area of the last location area update procedure. When the target location area is different from the current location area, the UE performs the location area update procedure to update the location area information. In this situation, the UTRAN is able to obtain the location area information of the UE during the handover instead of after the handover. The timely reported location area information reduces the delay of the service establishment (e.g. call establishment).

Preferably, the location area update procedure is a LOCATION UPDATING procedure if the UTRAN location area information includes a LAC (location area code) or a LAI (location area identity), or a ROUTING AREA UPDATE procedure if the UTRAN location area information includes a RAC (routing area code) or a RAI (routing area identity).

Figure 13:
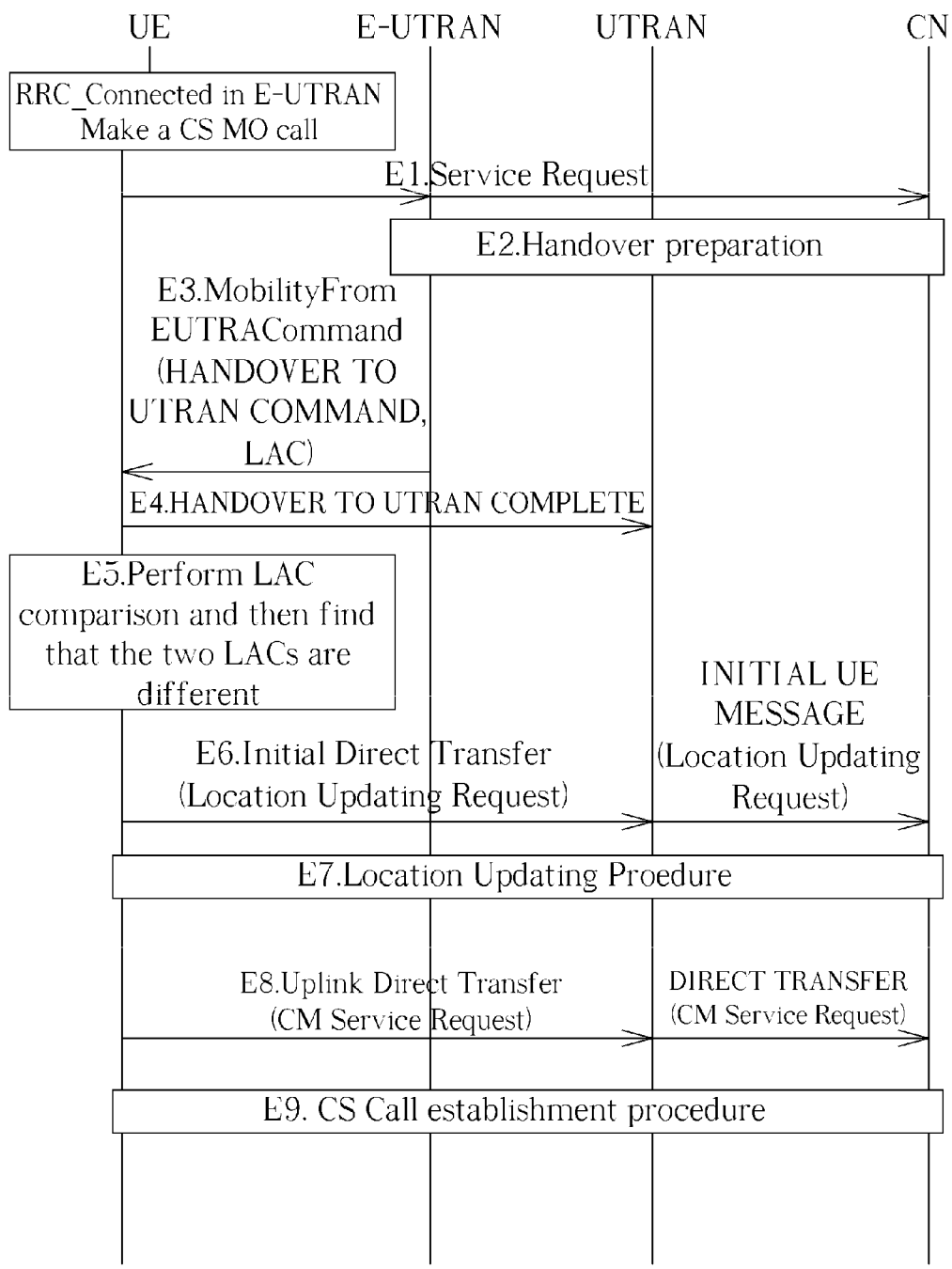
FIG. 13 illustrates a sequence diagram of a handover from the LTE to UMTS system.

Take an example for explanation of the concept of the process 1200. Please refer to FIG. 13, which is a sequence diagram of a handover from the LTE to UMTS system. For simplicity, the CN is considered including serving CN terminals, such as a MME and a SGSN, or a target CN terminal, such as MSC. In FIG. 13, the UE has an initial RRC state of the RRC_Connected mode and makes a CS MO call. In step E1, the E-UTRAN transfer a service request for the CS MO call from the UE to the serving CN terminals. In step E2, the E-UTRAN, the UTRAN, and the CN prepare a handover from the E-UTRAN to UTRAN since none of CS services is supported by E-UTRAN. In step E3, the E-UTRAN sends a MobilityFromEUTRACommand message including a HANDOVER TO UTRAN COMMAND message and a LAC of the UTRAN to initiate the handover. After a HANDOVER TO UTRAN COMPLETE message is sent to the UTRAN for completion of the handover in step E4, the UE compares the received LAC with a currently-stored LAC and then finds that the two LACs are different in step E5. In this situation, the UE sends an Initial Direct Transfer message including a location updating request to the UTRAN in step E6 so as to perform a location area update procedure in step E7. After this, the UE can perform the CS MO call through steps E8 and E9, where the CS call establishment procedure of step E9 includes a service request response related to the service request of step E1. Thus, the location area update procedure is performed before the service request response for the CS MO call in order to prevent a service request reject made because of the different LACs of the UE and the target CN terminal.

Figure 14:
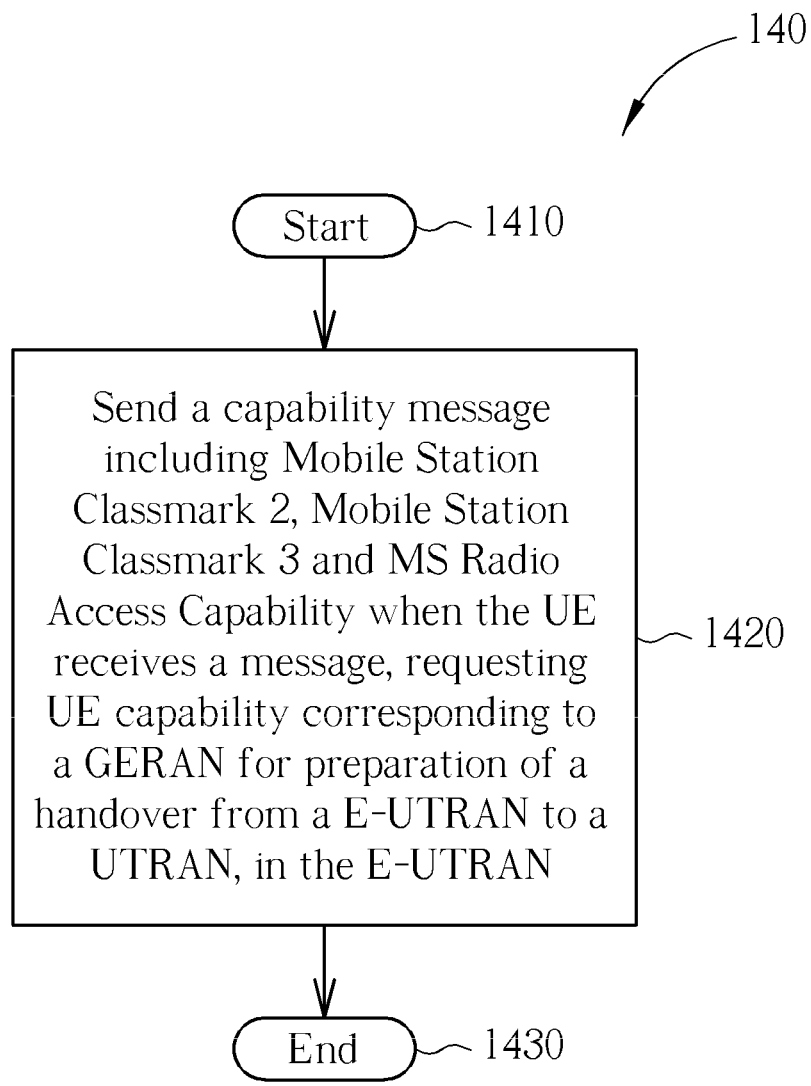
FIG. 14 illustrates a flowchart of a process according to an embodiment of the present invention.

Please refer to FIG. 14, which illustrates a flowchart of a process 1400 according to an embodiment of the present invention. The process 1400 is utilized for handling packet element transmission for a UE supporting the GSM and LTE systems. The process 1400 can be compiled into the program code 214 and includes the following steps:

Step 1410: Start.

Step 1420: Send a capability message including Mobile Station Classmark 2, Mobile Station Classmark 3 and MS Radio Access Capability when the UE receives a message, requesting UE capability corresponding to a GERAN for preparation of a handover from an E-UTRAN to a UTRAN, in the E-UTRAN.

Step 1430: End.

According to the process 1400, the UE sends GERAN capability including Mobile Station Classmark 2, Mobile Station Classmark 3 and MS Radio Access Capability to the E-UTRAN via the capability message when a message requesting UE capability corresponding to a GERAN is received from the E-UTRAN. As a result, the E-UTRAN is able to transfer the GERAN capability of the UE to the UTRAN, thereby preventing signaling or connection errors caused by insufficient capabilities information when a handover from the E-UTRAN to GERAN is performed.

If the UE also has GERAN Iu capability, the UE further includes MS GERAN Iu mode Radio Access Capability in the capability message. Preferably, the capability message is a UE CAPABILITY INFORMATION message, and the message requesting UE capability corresponding to the GERAN is a UE CAPABILITY ENQUIRY message.

Figure 15:
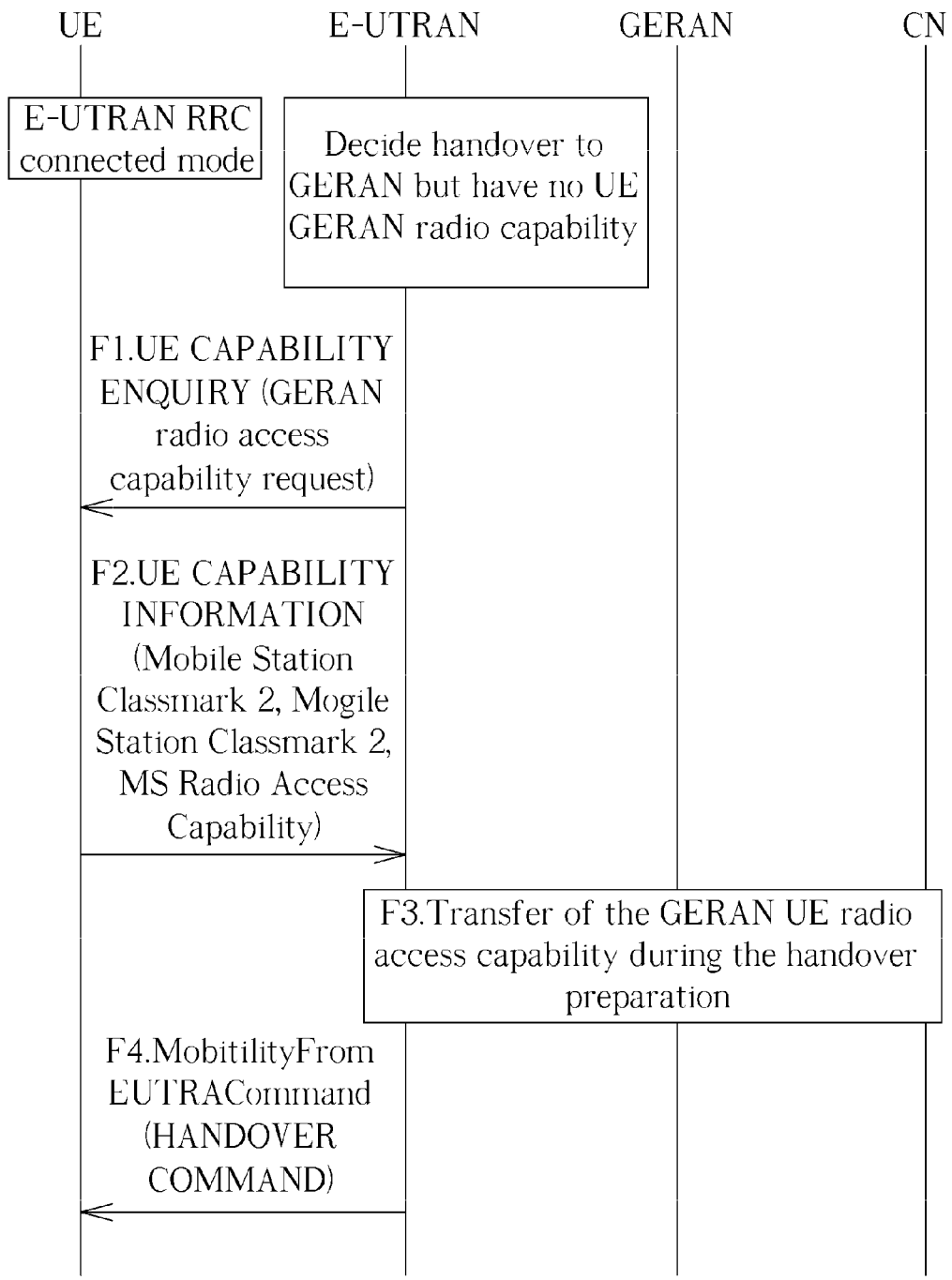
FIG. 15 illustrates a sequence diagram of a UE capability reporting procedure related to an inter-RAT handover.

Take an example for explanation of the concept of the process 1400. Please refer to FIG. 15, which is a sequence diagram of a UE capability reporting procedure related to an inter-RAT handover. In FIG. 15, the UE has an initial RRC state of an RRC_Connected mode, whereas the E-UTRAN decides to initiate a handover to GERAN but has none of GERAN capability of the UE. As a result, the E-UTRAN initiates a capability enquiry procedure by sending a UE CAPABILITY ENQUIRY message including a GERAN radio access capability request in step F1. In response to the GERAN radio access capability request, the UE performs step F2 to send a UE CAPABILITY INFORMATION message including Mobile Station Classmark 2, Mobile Station Classmark 3, and MS Radio Access Capability. In step F3, the E-UTRAN transfers whole GERAN UE radio access capability (i.e. the Mobile Station Classmark 2, Mobile Station Classmark 3, and MS Radio Access Capability) to the GERAN during the handover preparation. When the E-UTRAN initiates the handover from the E-UTRAN to GERAN by sending a MobilityFromEUTRACommand message in step F4, the GERAN has known GERAN capability of the UE and can properly configures a HANDOVER COMMAND message included in the MobilityFromEUTRACommand. With the GERAN radio access capability, the GERAN can properly configure the "HANDOVER COMMAND" message for pursuit of a successful handover.

In conclusion, the embodiments of the present invention enhance probability of successfully performing the inter-RAT handover with improved capability, mobility, and security configuring processes.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling an inter-radio access technology, hereinafter called RAT, handover for a mobile device, the method comprising:
when the mobile device uses a E-UTRAN to receive a message requesting device capability corresponding to a UTRAN before the mobile device performs a handover to a target network using the UTRAN, sending a capability message comprising an INTER RAT HANDOVER INFO message to a serving network using the E-UTRAN; and when, during the handover from the serving network using the E-UTRAN to the target network using the UTRAN, a connection to the target network is established successfully, using a START value of a packet switched domain for ciphering and transmitting the START value to the target network with a UE CAPABILITY INFORMATION message;

wherein the message requesting the device capability corresponding to the UTRAN is a UE CAPABILITY ENQUIRY message, and the capability message transmitted to the E-UTRAN is the UE CAPABILITY INFORMATION message.

2. The method of claim 1, wherein the INTER RAT HANDOVER INFO message is a radio resource control message used in the UTRAN.

3. The method of claim 1, wherein the capability message comprises security configuration used for packet switched domain or circuit switched domain, or the INTER RAT HANDOVER INFO message comprises the security configuration used for the packet switched domain or the circuit switched domain.

4. The method of claim 3, wherein the security configuration is a STARTPS value when the security configuration is used for the packet switched domain, or the security configuration is a STARTCS value when the security configuration is used for the circuit switched domain.

5. The method of claim 1, wherein the INTER RAT HANDOVER INFO message includes capability information of the UTRAN.

6. The method of claim 5, further comprising when the mobile device uses a E-UTRAN and receives a message requesting device capability corresponding to a GERAN, sending a capability message comprising at least one of Mobile Station Classmark 2, Mobile Station Classmark 3, MS Radio Access Capability and MS GERAN Iu mode Radio Access Capability when the message requesting device capability corresponding to a UTRAN further requests device capability corresponding to a GERAN, wherein the message requesting the device capability corresponding to the GERAN is a UE CAPABILITY ENQUIRY message, and the capability message transmitted to the E-UTRAN is a UE CAPABILITY INFORMATION message.

7. The method of claim 1, further comprising receiving a HANDOVER TO UTRAN COMMAND message when the handover is initiated.

8. The method of claim 1 further comprising transmitting the START value to the target network with a RRC CONNECTION SETUP COMPLETE message.

9. A communication device of a wireless communication system for accurately handling an inter-radio access technology, hereinafter called RAT, handover, the communication device comprising:
a computer readable recording medium for storing program code corresponding to a process; and
a processor coupled to the computer readable recording medium, for processing the program code to execute the process;
wherein the process comprises:
when the communication device using a E-UTRAN to receive a message requesting device capability corresponding to a UTRAN before performing a handover to a target network using the UTRAN, sending a capability message, comprising an INTER RAT HANDOVER INFO message, to a serving network using the E-UTRAN; and
when, during the handover from the serving network using the E-UTRAN to the target network using the UTRAN, a connection to the target network is established successfully, using a START value of a packet switched domain for ciphering and transmitting the START value to the target network with a UE CAPABILITY INFORMATION message;

wherein the message requesting the device capability corresponding to the UTRAN is a UE CAPABILITY ENQUIRY message, and the capability message transmitted to the E-UTRAN is the UE CAPABILITY INFORMATION message.

10. The communication device of claim 9, wherein the INTER RAT HANDOVER INFO message is a radio resource control message used in the UTRAN.

11. The communication device of claim 9, wherein the capability message comprises security configuration used for packet switched domain or circuit switched domain, or the INTER RAT HANDOVER INFO message comprises the security configuration used for the packet switched domain or the circuit switched domain.

12. The communication device of claim 11, wherein the security configuration is a STARTPS value when the security configuration is used for the packet switched domain, or the security configuration is a STARTCS value when the security configuration is used for the circuit switched domain.

13. The communication device of claim 9, wherein the INTER RAT HANDOVER INFO message includes capability information of the UTRAN.

14. The communication device of claim 13, wherein the process further comprises when the mobile device uses a E-UTRAN and receives a message requesting device capability corresponding to a GERAN, sending a capability message comprising at least one of Mobile Station Classmark 2, Mobile Station Classmark 3, MS Radio Access Capability and MS GERAN Iu mode Radio Access Capability when the message requesting device capability corresponding to a UTRAN further requests device capability corresponding to a GERAN, wherein the message requesting the device capability corresponding to the GERAN is a UE CAPABILITY ENQUIRY message, and the capability message transmitted to the E-UTRAN is a UE CAPABILITY INFORMATION message.

* * * * *